US008043680B2

(12) United States Patent
Ding et al.

(10) Patent No.: US 8,043,680 B2
(45) Date of Patent: Oct. 25, 2011

(54) MULTIPLE LAYER STRUCTURES COMPRISING A POLY (VINYLIDENE CHLORIDE) LAYER

(75) Inventors: Yuanpang S. Ding, Libertyville, IL (US); Michael Tung-Kiung Ling, Vernon Hills, IL (US); Moh-Ching Oliver Chang, Lake in the Hills, IL (US); Jean-Michel Vallee, Horrues (BE); Gregg Nebgen, Burlington, WI (US)

(73) Assignees: Baxter International Inc., Deerfield, IL (US); Baxter Healthcare S.A., Glattpark (Opfikon) (CH)

( * ) Notice: Subject to any disclaimer, the term of this patent is extended or adjusted under 35 U.S.C. 154(b) by 799 days.

(21) Appl. No.: 12/118,296

(22) Filed: May 9, 2008

(65) Prior Publication Data

US 2008/0280084 A1 Nov. 13, 2008

Related U.S. Application Data

(60) Provisional application No. 60/916,883, filed on May 9, 2007.

(51) Int. Cl.
*B29D 22/00* (2006.01)
*B29D 23/00* (2006.01)
*B32B 1/08* (2006.01)

(52) U.S. Cl. ... 428/36.6; 428/35.7; 428/343; 428/355 R; 428/355 AC; 428/355 EP; 428/355 N; 428/346

(58) Field of Classification Search .................. 428/34.1, 428/35.7, 36.6, 36.7, 36.9, 36.91, 343, 355 R, 428/355 AC, 355 EP, 355 N, 346
See application file for complete search history.

(56) References Cited

U.S. PATENT DOCUMENTS

| 6,037,063 | A  | 3/2000  | Muschiatti et al. |
| 6,045,924 | A  | 4/2000  | Bekele |
| 6,479,162 | B1 | 11/2002 | Bekele |
| 2003/0026932 | A1 | 2/2003 | Johnson et al. |
| 2004/0241482 | A1 | 12/2004 | Grah et al. |
| 2007/0014953 | A1 | 1/2007 | Siegel et al. |
| 2007/0020448 | A1 | 1/2007 | Hubbard et al. |
| 2007/0087131 | A1 | 4/2007 | Hutchinson et al. |

FOREIGN PATENT DOCUMENTS

| EP | 0918813   | 6/1999 |
| EP | 1484176   | 12/2004 |
| EP | 1731304   | 12/2006 |
| WO | WO0026024 | 5/2000 |
| WO | WO0126897 | 4/2001 |

OTHER PUBLICATIONS

International Preliminary Report on Patentability—mailing date Nov. 19, 2009 (4 pgs.).
Written Opinion of the International Searching Authority (4 pgs.).

*Primary Examiner* — Michael C Miggins
(74) *Attorney, Agent, or Firm* — K&L Gates LLP

(57) ABSTRACT

Multiple layer structures comprising one or more poly(vinylidene chloride) layers and containers made from the multiple layer structures are provided. In a general embodiment, the present disclosure provides a multiple layer structure comprising one or more PVDC layers comprising a component selected from the group consisting of a poly(vinylidene chloride), a poly(vinylidene chloride) copolymer, and combinations thereof. The multiple layer structure further comprises one or more tie layers attached to the PVDC layer. The tie layer comprises a component selected from the group consisting of (a) polyether polyester copolymers, (b) polyurethanes having a melting temperature above about 121° C., (c) a blend comprising a polyamide and an ethylene copolymer containing an amine reactive functional group, and combinations thereof.

15 Claims, 4 Drawing Sheets

MULTIPLE LAYER STRUCTURES COMPRISING A POLY (VINYLIDENE CHLORIDE) LAYER

PRIORITY CLAIM

This application claims the benefit of U.S. Provisional Patent Application Ser. No. 60/916,883 filed on May 9, 2007, the entire disclosure of which is hereby incorporated.

BACKGROUND

The present disclosure relates generally to polymer structures. More specifically, the present disclosure relates to multiple layer structures comprising a poly(vinylidene chloride) layer.

Poly(vinylidene chloride) (PVDC) has been a barrier layer in co-extruded film structures for various packaging applications. One of the difficulties of utilizing PVDC in a co-extruded structure is finding a suitable tie layer to bond the PVDC layer to other polymeric materials. Various tie layer materials such as ethylene vinyl acetate (EVA), ethylene methyl acrylate (EMA) or ethylene acrylic acid (EAA) have been used as a tie layer with PVDC for non-retortable applications. However, there are very few tie layer materials for PVDC that can survive retort application.

A good tie layer usually needs to have some miscibility with the substrate to create entanglement at the interface, or have chemical reactivity with the substrate to create chemical bonds. For retortable applications, the tie layer material should be resistant to heat sterilization, for example, at temperatures greater than about 121° C. Tie layer materials such as EVA, EMA and EAA all have melt points below 121° C. and are not able to resist mechanical deformation during steam sterilization.

SUMMARY

The present disclosure relates to multiple layer structures comprising one or more poly(vinylidene chloride) layers and containers made from the multiple layer structures. In a general embodiment, the present disclosure provides a multiple layer structure comprising one or more PVDC layers comprising a component selected from the group consisting of a poly(vinylidene chloride), a poly(vinylidene chloride) copolymer, and combinations thereof. The multiple layer structure further comprises one or more tie layers attached to the PVDC layer.

The tie layer can comprise a component selected from the group consisting of (a) polyether polyester copolymers, (b) polyurethanes having a melting temperature above about 121° C., (c) a blend comprising a polyamide and an ethylene copolymer containing an amine reactive functional group, and combinations thereof. The polyether polyester copolymer can be polycyclohexanedimethanol cyclohexanedicarboxylic acid polyether copolymer, polytetramethylene glycol polybutylene terephthalate copolymer, or a combination thereof.

In an embodiment, the ethylene copolymer comprises a copolymer of ethylene with (i) a vinyl carboxylic acid ester or (ii) an unsaturated carboxylic acid or ester thereof. In another embodiment, the amine reactive functional group is selected from carboxylic acid anhydride residues and epoxy groups.

In an embodiment, the multiple layer structure consists essentially of the PVDC layer and the tie layer. In another embodiment, the multiple layer structure further comprises a second layer, the tie layer being disposed between the PVDC layer and the second layer. The second layer can be heat sealable. The second layer can also comprise a polymer selected from polypropylene homopolymers, polypropylene copolymers, and polyethylene copolymers.

In an embodiment, the multiple layer structure further comprises a skin layer attached to the PVDC layer on a side thereof remote from the tie layer. The skin layer can comprise a polyester polyether copolymer.

In an embodiment, the multiple layer structure further comprises a third layer disposed on a side of the PVDC layer remote from the tie layer. The third layer can be substantially free of vinyl chloride containing polymers and be attached to the PVDC layer by a second tie layer.

In an embodiment, the tie layer comprises a blend of a polyamide and a maleic anhydride modified ethylene-vinyl acetate copolymer. In another embodiment, the tie layer comprises a blend of a polyamide and an epoxy-containing copolymer of ethylene with a component selected from the group consisting of vinyl acetate, methyl acrylate, methyl methacrylate, and acrylic acid. In an alternative embodiment, the tie layer comprises a blend of a polyamide and an ethylene-methyl acrylate-glycidyl methacrylate terpolymer.

In another embodiment, the present disclosure provides a multiple layer structure comprising a skin layer and a PVDC layer attached to the skin layer. The PVDC layer consists essentially of a component selected from the group consisting of a poly(vinylidene chloride), a poly(vinylidene chloride) copolymer, and combinations thereof attached to the heat seal layer. The multiple layer structure further comprises a tie layer attached to the PVDC layer and a heat seal layer attached to the tie layer. The tie layer comprises a component selected from the group consisting of (a) polyether polyester copolymers, (b) polyurethanes having a melting temperature above about 121° C., (c) a blend comprising a polyamide and an ethylene copolymer containing an amine reactive functional group, and combinations thereof.

In an alternative embodiment, the present disclosure provides a multiple layer structure comprising a skin layer at a first surface of the structure and a PVDC layer comprising a component selected from the group consisting of a poly(vinylidene chloride), a poly(vinylidene chloride) copolymer, and combinations thereof attached to the skin layer. The multiple layer structure further comprises one or more tie layers attached to at least one side of the PVDC layer and a heat seal layer at a second surface opposite of the skin layer of the first surface. The tie layer comprises a component selected from the group consisting of (a) polyether polyester copolymers, (b) polyurethanes having a melting temperature above about 121° C., (c) a blend comprising a polyamide and an ethylene copolymer containing an amine reactive functional group, and combinations thereof.

In an embodiment, the multiple layer structure further comprises one tie layer attached to one side of the PVDC layer and one tie layer attached to an opposite side of the PVDC layer. The tie layers and the PVDC layer can be disposed between the skin layer and the heat seal layer.

In an embodiment, the multiple layer structure further comprises one tie layer attached to one side of the PVDC layer and two adjacent tie layers attached to an opposite side of the PVDC layer. The tie layers and the PVDC layer can be disposed between the skin layer and the heat seal layer.

In an embodiment, the multiple layer structure further comprises two adjacent tie layers attached to one side of the PVDC layer and two adjacent tie layers attached to an opposite side of the PVDC layer. The tie layers and the PVDC layer can be disposed between the skin layer and the heat seal layer.

In yet another embodiment, the present disclosure provides a container comprising a body defined, in part, by a multiple layer film comprising at least one PVDC layer comprising a component selected from the group consisting of a poly(vinylidene chloride), a poly(vinylidene chloride) copolymer, and combinations thereof, and a tie layer attached to the PVDC layer. The tie layer comprises a component selected from the group consisting of (a) polyether polyester copolymers, (b) polyurethanes having a melting temperature above about 121° C., (c) a blend comprising a polyamide and an ethylene copolymer containing an amine reactive functional group, and combinations thereof.

An advantage of the present disclosure is to provide improved films having a poly(vinylidene chloride) layer.

Another advantage of the present disclosure is to provide improved tie layers for films having a poly(vinylidene chloride) layer.

Still another advantage of the present disclosure is to provide improved containers made from multiple layer structures having a poly(vinylidene chloride) layer.

Additional features and advantages are described herein, and will be apparent from the following Detailed Description and the figures.

DETAILED DESCRIPTION

The present disclosure relates to multiple layer structures comprising one or more poly(vinylidene chloride) layers. The multiple layer structures can be suitable for co-extrusion processes and for fabricating medical solution containers made from the multiple layer structures. The multiple layer structures can also be capable of withstanding moist heat sterilization, for example, at a temperature around 121° C.

Figure 1:
FIG. 1 is a cross-sectional view of a two-layer structure in an embodiment of the present disclosure.

In a general embodiment shown in FIG. 1, the present disclosure provides a two-layer structure comprising a PVDC layer 10 attached to a tie layer 12. The PVDC layer 10 comprises a component selected from the group consisting of a poly(vinylidene chloride), a poly(vinylidene chloride) copolymer, and combinations thereof. In another embodiment, the PVDC layer 10 consists essentially of a component selected from the group consisting of a poly(vinylidene chloride), a poly(vinylidene chloride) copolymer, and combinations thereof. The tie layer 12 comprises one or more of components: (a) polyether polyester copolymers, (b) polyurethanes having a melting temperature above about 121° C., and (c) a blend comprising a polyamide and an ethylene copolymer containing an amine reactive functional group.

As used herein, the term "attached" means attached directly or indirectly. For example, the PVDC layer can be attached directly to the tie layer or attached indirectly to the tie layer via means of one or more intermediate layers.

An example of the polyether polyester copolymer can include polycyclohexanedimethanolcyclohexanedicarboxylic acid polyether copolymer (PCCE) sold by Eastman Chemicals under the ECDEL® tradename. Another example of the polyether polyester copolymer can be polytetramethylene oxide teraphthalate copolymer sold by DuPont Co. under the HYTREL® tradename. An example of polyurethane can be polyetherurethane sold by Bayer under the DESMOPANE® or TEXIN® tradename or by Dow Chemicals under the PELLETHANE® tradename. All these materials have melting temperatures higher than typical steam sterilization temperatures and some polarity property that has a chance to bond to PVDC and survive the steam sterilization.

Because EVA creates good bonding to PVDC as a tie layer, but suffers from a low melting temperature, chemically grafting a higher melting point material onto EVA could be helpful to bring up the temperature resistance of EVA. Maleic anhydride modified EVA can react with polymers having an amine functional group. Polyamides having a residue amine end group and having a melting temperature higher than 120° C. will have chance to graft onto EVA to help it survive steam sterilization. Examples of maleic anhydride modified EVA include those sold by DuPont Co. under the BYNEL® tradename. An example of a polyamide includes the MACROMELT® 6900B, which has a high level of amine terminal groups and a melting point around 120° C.

In still another embodiment, the tie layer material is made from a polymer blend made of 1) an epoxy containing copolymers of EVA, EMA, or EAA and 2) polyamide, Similar to the maleic anhydride to amine reaction, epoxy groups can also react to amine functional groups. Therefore, ethylene/methacrylate/glycidil methacrylate copolymer can also be an alternative to maleic anhydride modified EVA in the EVA/polyamide alloy for PVDC tie layer applications. An example of a copolymer that containing epoxy group includes LOTADER® 8920.

Figure 2:
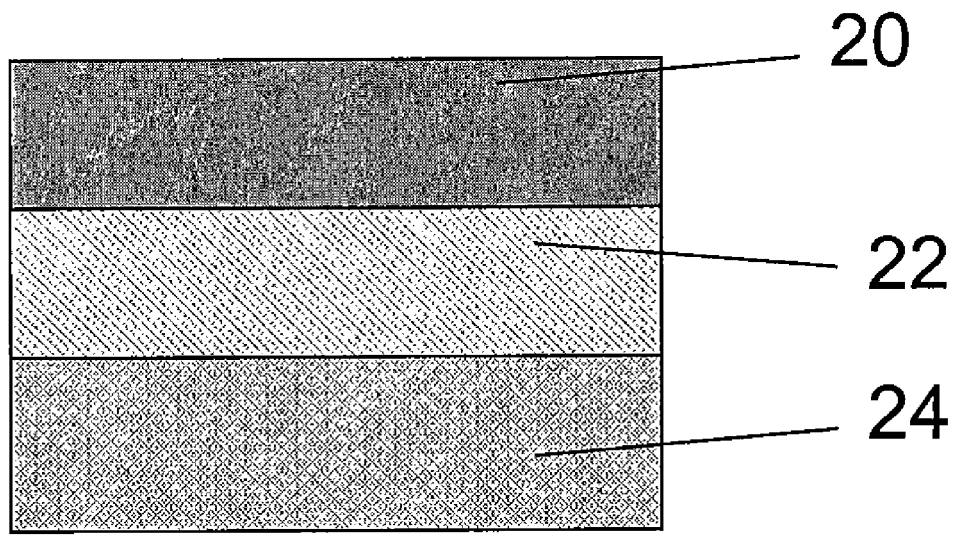
FIG. 2 is a cross-sectional view of a three-layer structure in an embodiment of the present disclosure.

In another embodiment shown in FIG. 2, the present disclosure provides a three-layer structure comprising a PVDC layer 20 attached to a tie layer 22 on one side and a heat seal layer 24 attached to the tie layer 22 on the opposing side. In another embodiment of the three-layer structure, layer 20 is a skin layer, layer 22 is a PVDC layer and layer 24 is a heat seal layer with a tie material (e.g. maleated EVA/PP and PA).

The skin layer in alternative embodiments of the present disclosure can comprise polypropylene homopolymers, polypropylene random copolymers, polyamides, styrene-ethylene-butylene-styrene block copolymers, copolyester ether block copolymers, or a combination thereof. The skin layer in embodiments of the present disclosure can be made from a polyether polyester copolymer such as, for example, polycyclohexanedimethanol cyclohexanedicarboxylic acid polyether copolymer, polytetramethylene glycol polybutylene terephthalate copolymer, and combinations thereof. The tie layers in alternative embodiments of the present disclosure can comprise one or more of components: (a) polyether polyester copolymers, (b) polyurethanes having a melting temperature above about 121° C., and (c) a blend comprising a polyamide and an ethylene copolymer containing an amine reactive functional group.

The heat seal layer in alternative embodiments of the present disclosure can comprise one or more propylene-containing polymers. Suitable propylene-containing polymers include those selected from the group consisting of homopolymers of polypropylene, and copolymers and terpolymers of propylene with one or more comonomers selected from α-olefins having from 2 to about 18 carbons. Suitable polypropylene copolymers and terpolymers include random or block propylene and ethylene copolymers or random or block propylene/ethylene/butene terpolymers. The heat seal layer may further include any additional components such as, for example, EVA.

Figure 3:
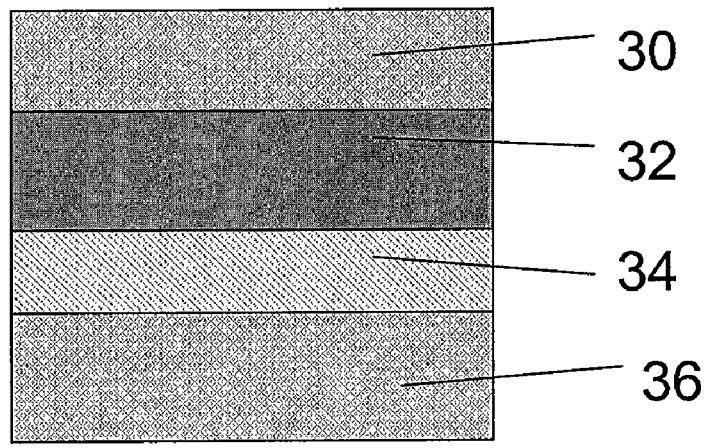
FIG. 3 is a cross-sectional view of a four-layer structure in an embodiment of the present disclosure.

In an alternative embodiment shown in FIG. 3, the present disclosure provides a four-layer structure comprising a skin layer 30, a PVDC layer 32 attached to the skin layer 30, a tie layer 34 attached to the PVDC layer 32 and a heat seal layer 36 attached to the tie layer 34.

Figure 4:
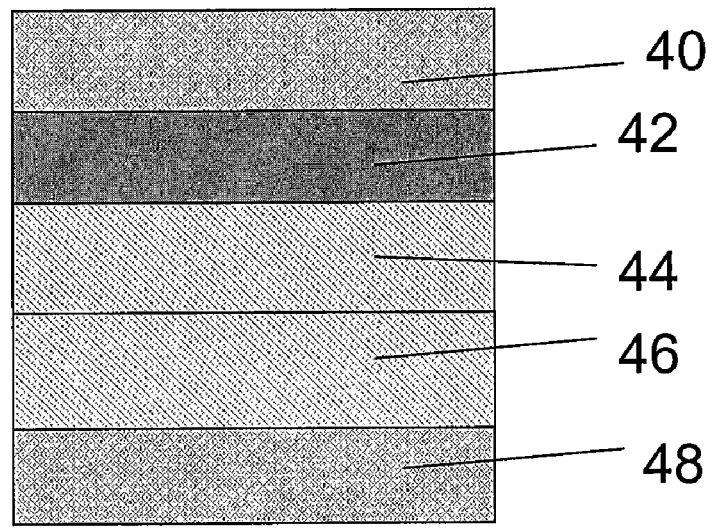
FIG. 4 is a cross-sectional view of a five-layer structure in an embodiment of the present disclosure.

In yet another embodiment shown in FIG. 4, the present disclosure provides a five-layer structure comprising a skin layer 40, a PVDC layer 42 attached to the skin layer 40, a first tie layer 44 attached to the PVDC layer 42, a second tie layer 46 attached to the first tie layer 44 and a heat seal layer 48 attached to the second tie layer 46. In an alternative embodiment of the five-layer structure, layer 40 is a skin layer, layer 42 is a first tie layer attached to the skin layer 40, layer 44 is a PVDC layer attached to the first tie layer 42, layer 46 is a second tie layer attached to the PVDC layer 44 and layer 48 is a heat seal layer attached to the second tie layer 46.

Figure 5:
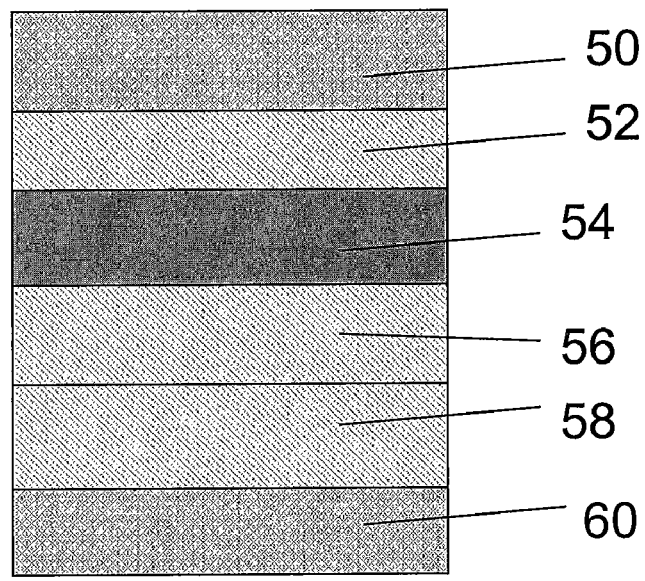
FIG. 5 is a cross-sectional view of a six-layer structure in an embodiment of the present disclosure.

In another embodiment shown in FIG. 5, the present disclosure provides a six-layer structure comprising a skin layer 50, a first tie layer 52 attached to the skin layer 50, a PVDC layer 54 attached to the first tie layer 52, a second tie layer 56 attached to the PVDC layer 54, a third tie layer 58 attached to the second tie layer 56 and a heat seal layer 60 attached to the third tie layer 58.

Figure 6:
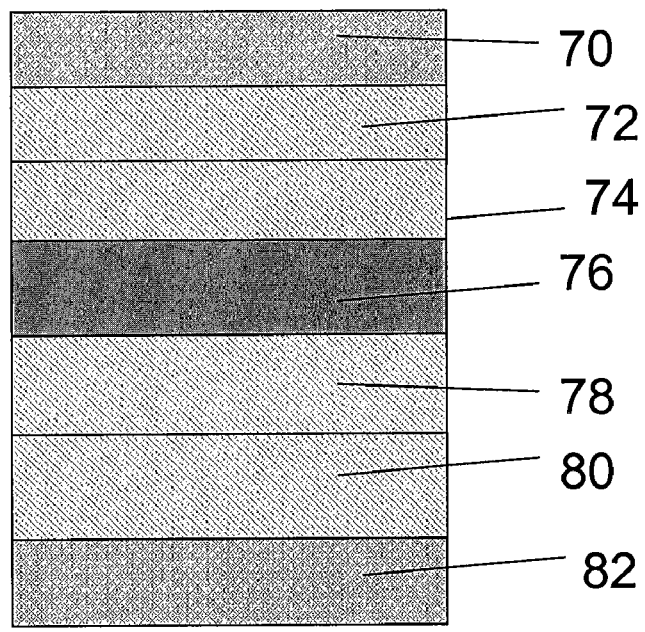
FIG. 6 is a cross-sectional view of a seven-layer structure in an embodiment of the present disclosure.

In an embodiment shown in FIG. 6, the present disclosure provides a seven-layer structure comprising a skin layer 70, a first tie layer 72 attached to the skin layer 70, a second tie layer 74 attached to the first tie layer 72, a PVDC layer 76 attached to the second tie layer 74, a third tie layer 78 attached to the PVDC layer 76, a fourth tie layer 80 attached to the third tie layer 78 and a heat seal layer 82 attached to the fourth tie layer 80.

The multiple layer structures can be made using any suitable processes. For example, the multiple layered structure can be made using a coextrusion film process. The coextrusion processes can provide a suitable combination of different material layers (e.g. 2 to 7) in order to generate films that meet desirable or required technical requirements with respect to mechanical and physical/chemical properties such as impact resistance or moisture/oxygen barrier performances. The layers can also have any suitable thickness such as, for example, ranging from about 0.2 mm to about 3.0 mm thick.

Figure 7:
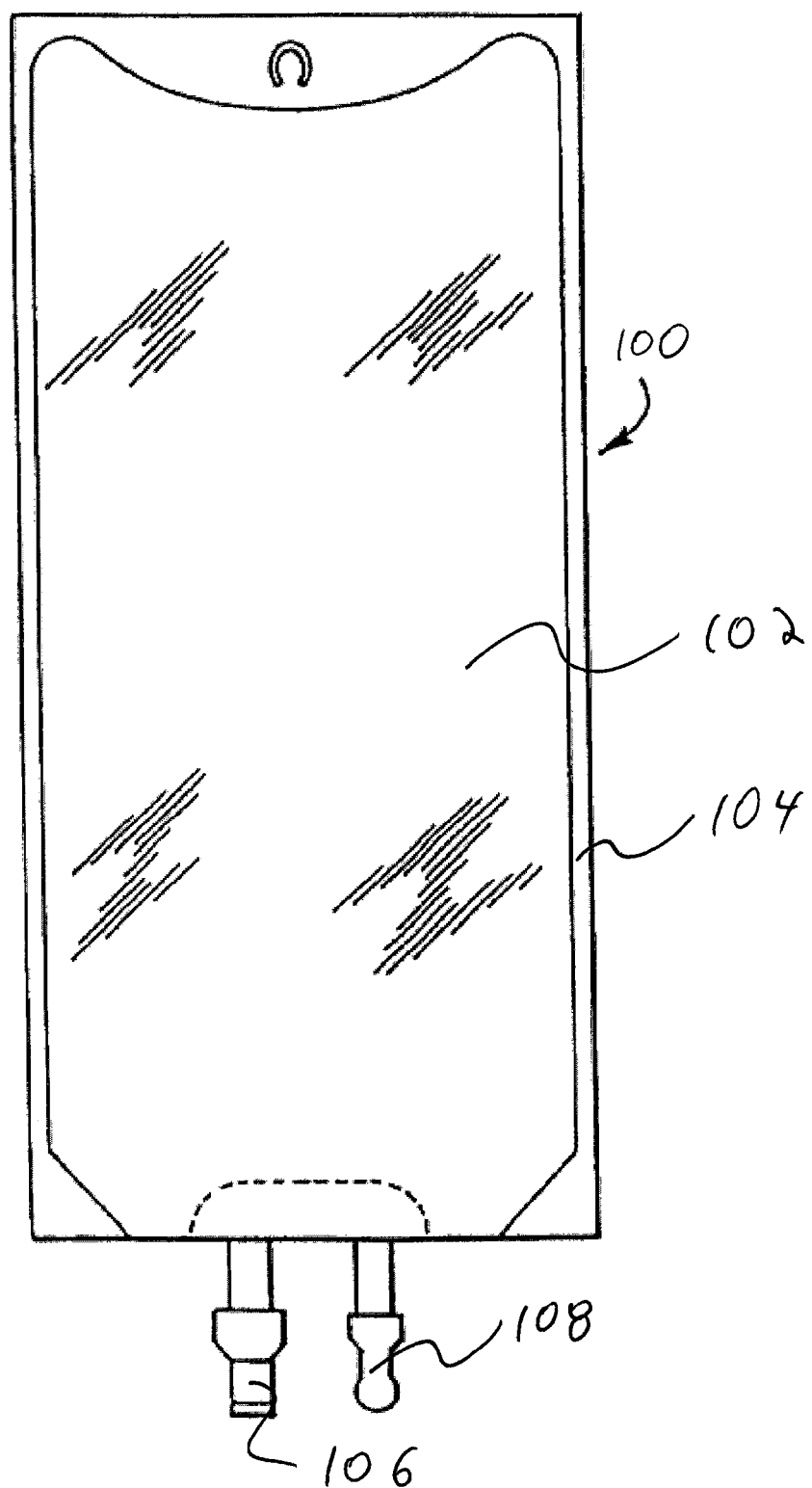
FIG. 7 illustrates a container fabricated from a multiple layer structure in an embodiment of the present disclosure.

The multiple layer structures in embodiments of the present disclosure can be used to make any suitable containers, for example, used to hold a substance such as a pharmaceutical/medical compound or solution. In an embodiment shown in FIG. 7, the present disclosure provides a container 100 comprising a first sidewall 102 and a second sidewall (not shown) opposite the first sidewall sealed together along a peripheral seam 104 to define a fluid chamber. The container 100 can comprise one or more port tubes 106 and 108 that are used to fill and empty the contents of the container 100. Any one or more of the sidewalls can be fabricated from any of the multiple layered structures set forth above.

In an embodiment, the first sidewall and/or second sidewall of the container or any suitable portion of the container walls is made from a multiple layer film comprising at least one PVDC layer comprising a component selected from the group consisting of a poly(vinylidene chloride), a poly(vinylidene chloride) copolymer, and combinations thereof, and a tie layer attached to the PVDC layer. The tie layer can comprise one or more of components: (a) polyether polyester copolymers, (b) polyurethanes having a melting temperature above about 121° C. and (c) a blend comprising a polyamide and an ethylene copolymer containing an amine reactive functional group.

EXAMPLES

By way of example and not limitation, the following examples are illustrative of various embodiments of the present disclosure.

TABLE 1

Examples of polymer formulations that can be used as tie layer for PVDC co-extruded structures

| Tie layer material type | Example Composition | Example Resin Grade |
|---|---|---|
| Polyether polyester copolymer | 100% | Ecdel 9966, Ecdel 9965 |
| Polyether polyester copolymer | 100% | Hytrel 4056, Hytrel G3548 |
| Polyurethane | 100% | Texin 985, Desmopan 8670, Pellethane |
| Alloy of Maleic anhydride modified EVA, Polyamide and Maleic anhydride modified PP | 70/25/0, 90/10/0, 70/5/25 | EVA: Bynel 3810, Bynel 3861 Polyamide: Nylon 11, Nylon 12, Poly fatty amide - Macromelt 6900B PP: Bynel 50E561 |
| Alloy of epoxy containing ethylene copolymer, polyamide and PP | 70/25/0, 90/10/0, 70/5/25 | Epoxy containing polymer: Lotader 8920, Lotader 8840 Polyamide: Nylon 11, Nylon 12, Poly fatty amide - Macromelt 6900B PP: Bynel 50E561 |

TABLE 2

Test Results
Skin/Core/Skin structure of co-extruded films

| | SKIN | | | | | | | CORE | Thickness | Delamination by tear propagation |
|---|---|---|---|---|---|---|---|---|---|---|
| ID# | Macro. 6900B | Bynel 3861 | Bynel 50E561 | Kraton FG1924 | Hytrel 4056 | PCCE 9966 | Desm 8670 | PVDC | mil | After autoclave (n = 5) |
| 1 | 10 | 90 | 0 | 0 | 0 | 0 | 0 | IXAN PV910 | 9.0 | 3/5 minimal delamination |

TABLE 2-continued

Test Results
Skin/Core/Skin structure of co-extruded films

| | SKIN | | | | | | | | | Delamination by tear propagation |
|---|---|---|---|---|---|---|---|---|---|---|
| ID# | Macro. 6900B | Bynel 3861 | Bynel 50E561 | Kraton FG1924 | Hytrel 4056 | PCCE 9966 | Desm 8670 | CORE PVDC | Thickness mil | After autoclave (n = 5) |
| 2 | 25 | 75 | 0 | 0 | 0 | 0 | 0 | IXAN PV910 | 10.9 | no delamination |
| 3 | 5 | 70 | 25 | 0 | 0 | 0 | 0 | IXAN PV910 | 9.5 | no delamination |
| 4 | 0 | 70 | 30 | 0 | 0 | 0 | 0 | IXAN PV910 | 9.5 | 1/5 minimal delamination |
| 5 | 0 | 60 | 0 | 40 | 0 | 0 | 0 | IXAN PV910 | 9.3 | 1/5 severe delamination |
| 6(*) | 0 | 60 | 0 | 40 | 0 | 0 | 0 | IXAN PV910 | 10.0 | 1/5 minimal delamination |
| 7 | 0 | 0 | 100 | 0 | 0 | 0 | 0 | IXAN PV910 | 9.5 | 3/5 severe delamination |
| 8 | 0 | 0 | 0 | 0 | 100 | 0 | 0 | IXAN PV910 | 9.0 | no delamination |
| 9 | 0 | 0 | 0 | 0 | 0 | 0 | 100 | IXAN PV910 | 9.0 | no delamination |
| 10 | 0 | 0 | 0 | 0 | 0 | 100 | 0 | IXAN PV910 | 9.0 | no delamination |
| 11 | 0 | 0 | 0 | 0 | 0 | 0 | 100 | IXAN PV708 | 8.6 | no delamination |
| 12 | 0 | 0 | 0 | 0 | 0 | 0 | 100 | IXAN XVS 100 | 9.8 | 2/5 minimal delamination 2/5 severe delamination |
| 13 | 0 | 0 | 0 | 0 | 0 | 0 | 100 | DOW XUS32019.10L | 7.9 | minimal delamination |

NOTE
(*)5-layer structure: Zelas 7023/Bynel 3861 (60%)-
Kraton FG1924 (40%)/IXAN PVDC PV910/Bynel 3861 (60%)-
Kraton FG1924 (40%)/Zelas 7023
PVDC:
IXAN PV910: VDC/MA copolymer with 2% ESO (believed to be epoxy soybean oil)
IXAN PV708: VDC/VC copolymer
IXAN XVS 100: High Barrier
XU32019: VDC/MA copolymer It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A multiple layer structure comprising:
   at least one PVDC layer comprising a component selected from the group consisting of a poly(vinylidene chloride), a poly(vinylidene chloride) copolymer, and combinations thereof; and
   a tie layer attached to the PVDC layer, the tie layer comprising a blend of a polyamide and an epoxy-containing copolymer of ethylene with a component selected from the group consisting of vinyl acetate, methyl acrylate, methyl methacrylate, and acrylic acid.

2. The multiple layer structure of claim 1, wherein the structure consists essentially of the PVDC layer and the tie layer.

3. The multiple layer structure of claim 1 further comprising a third layer disposed on a side of the PVDC layer remote from the tie layer, the third layer being substantially free of vinyl chloride containing polymers and being attached to the PVDC layer by a second tie layer.

4. The multiple layer structure of claim 1, wherein the tie layer comprises a blend of a polyamide and an ethylene-methyl acrylate-glycidyl methacrylate terpolymer.

5. The multiple layer structure of claim 1 further comprising a second layer, the tie layer being disposed between the PVDC layer and the second layer.

6. The multiple layer structure of claim 5, wherein the second layer is heat sealable.

7. The multiple layer structure of claim 5, wherein the second layer comprises a polymer selected from the group consisting of polypropylene homopolymers, polypropylene copolymers, polyethylene copolymers, and combinations thereof.

8. The multiple layer structure of claim 1 further comprising a skin layer attached to the PVDC layer on a side thereof remote from the tie layer.

9. The multiple layer structure of claim 8, wherein the skin layer comprises a polyester polyether copolymer.

10. A multiple layer structure comprising:
    a skin layer;
    a PVDC layer attached to the skin layer, the PVDC layer comprising a component selected from the group consisting of a poly(vinylidene chloride), a poly(vinylidene chloride) copolymer, and combinations thereof attached to the heat seal layer;
    a tie layer attached to the PVDC layer, the tie layer comprising a blend of a polyamide and an epoxy-containing copolymer of ethylene with a component selected from the group consisting of vinyl acetate, methyl acrylate, methyl methacrylate, and acrylic acid; and
    a heat seal layer attached to the tie layer.

11. A multiple layer structure having a first surface and a second surface, the multiple layer structure comprising:

a skin layer at the first surface of the structure;

a PVDC layer comprising a component selected from the group consisting of a poly(vinylidene chloride), a poly(vinylidene chloride) copolymer, and combinations thereof attached to the skin layer;

at least one tie layer attached to at least one side of the PVDC layer, the tie layer comprising a blend of a polyamide and an epoxy-containing copolymer of ethylene with a component selected from the group consisting of vinyl acetate, methyl acrylate, methyl methacrylate, and acrylic acid; and a heat seal layer at the second surface that is opposite of the first surface.

12. The multiple layer structure of claim 11 comprising one tie layer attached to one side of the PVDC layer and one tie layer attached to an opposite side of the PVDC layer, the tie layers and the PVDC layer disposed between the skin layer and the heat seal layer.

13. The multiple layer structure of claim 11 comprising one tie layer attached to one side of the PVDC layer and two adjacent tie layers attached to an opposite side of the PVDC layer, the tie layers and the PVDC layer disposed between the skin layer and the heat seal layer.

14. The multiple layer structure of claim 11 comprising two adjacent tie layers attached to one side of the PVDC layer and two adjacent tie layers attached to an opposite side of the PVDC layer, the tie layers and the PVDC layer disposed between the skin layer and the heat seal layer.

15. A container comprising:

a body defined, in part, by a multiple layer film comprising at least one PVDC layer comprising a component selected from the group consisting of a poly(vinylidene chloride), a poly(vinylidene chloride) copolymer, and combinations thereof, and a tie layer attached to the PVDC layer, the tie layer comprising a blend of a polyamide and an epoxy-containing copolymer of ethylene with a component selected from the group consisting of vinyl acetate, methyl acrylate, methyl methacrylate, and acrylic acid.

* * * * *